Figure 1:
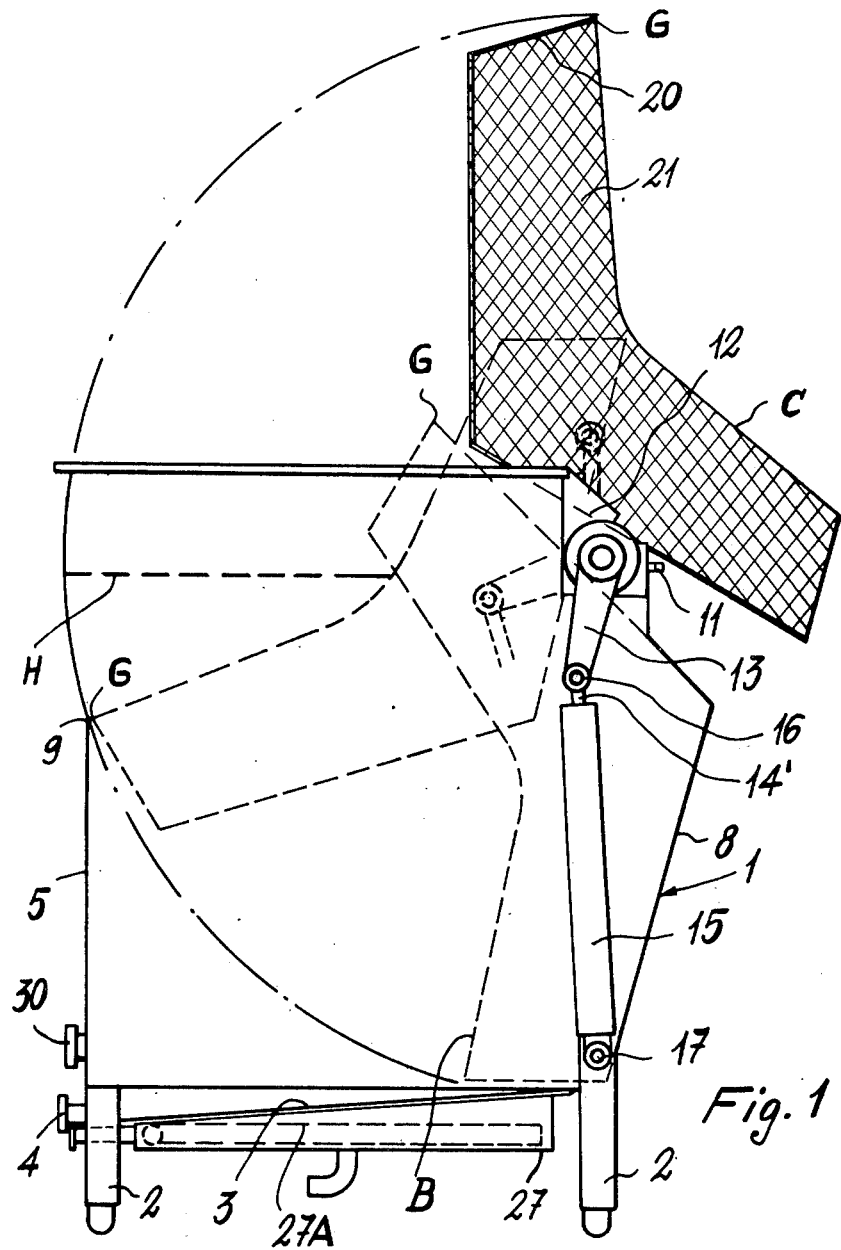

United States Patent [19]

Muzzarelli

[11] 4,222,321
[45] Sep. 16, 1980

[54] DEVICE FOR THE FLOCCULATION OF ALBUMIN FROM WHEY MATERIAL

[76] Inventor: Gabriele Muzzarelli, Modena, Italy

[21] Appl. No.: 954,573

[22] Filed: Oct. 25, 1978

[30] Foreign Application Priority Data

Nov. 3, 1977 [IT] Italy ............................. 22639/77[U]

[51] Int. Cl.³ ............................................. A01J 11/06
[52] U.S. Cl. .................................... 99/458; 210/256; 210/407
[58] Field of Search ................. 99/458, 450, 453, 456, 99/483; 4/222.1, 318, 322; 210/238, 256, 407, 195 S; 220/72

[56] References Cited

U.S. PATENT DOCUMENTS

| D. 201,400 | 6/1965 | Kneeland | 220/72 |
| 1,276,784 | 8/1918 | McGary et al. | 4/322 X |
| 2,813,631 | 11/1957 | Odman | 210/238 X |
| 3,279,633 | 10/1966 | Evers | 99/456 X |
| 3,495,711 | 2/1970 | Englesson et al. | 210/256 X |
| 3,580,161 | 5/1971 | Pontecorvo | 99/453 X |
| 3,647,110 | 3/1972 | Hammes | 220/72 |
| 3,835,999 | 9/1974 | Moore | 210/407 X |
| 3,975,997 | 8/1976 | Di Pietro | 99/407 |

Primary Examiner—Harvey C. Hornsby
Assistant Examiner—Arthur O. Henderson
Attorney, Agent, or Firm—Steinberg and Blake

[57] ABSTRACT

A device for the flocculation and collection of whey albumin is disclosed, as comprising a basin having a collecting vessel open at the top and at least on one side, at least partially permeable to liquids and rotably carried about a horizontal geometrical axis located at one of the basin walls, and controlled by power means so as to rotate about said axis from a position adjacent said wall to another position inclined with respect to the horizontal, at which latter position the collected product can be discharged through the open side of the collecting vessel.

1 Claim, 2 Drawing Figures

DEVICE FOR THE FLOCCULATION OF ALBUMIN FROM WHEY MATERIAL

This invention relates to a device for the flocculation and collection of whey albumin, thereby designed for use in milk-dairy industry for the production of buttermilk curd or similar products more or less enriched with other ingredients, such as dried milk, cream and the like.

For the purpose of milk-dairy industry, it is known that in addition to water milk comprises three different fractions or portions, namely fat, protein and albumin fractions. After removal of fat and protein fractions (for example, the former being intended for use in the production of butter and the latter in the production of cheese), a so-called whey material remains which contains the albumin fraction. In order to provide for separation of the latter, whey is brought to a temperature of about 80° C. in a trough or basin, wherein an agent is introduced, as generally comprising citric acid, causing an almost instantaneous flocculation of the albumin fraction representing the buttermilk curd. Prevailingly, the flocculation product is upward moved, forming a relatively continuous supernatant layer, that is a sort of soft crust, which at present is manually and progressively removed by means of knives or suitable implements. This is a tiring work and requires a good deal of labour, and not only it does not allow to recover the portion of albumin fraction that did not surface, but it would also cause losses due to parts of the layer being redispersed in the residual whey upon removal movements.

It is the primary object of the present invention to provide a device by which other ingredients can be added to the whey, such as cream, dried milk and the like, so that products relatable to buttermilk curd derivatives can be directly obtained.

A device according to the invention is essentially characterized by comprising a trough or basin having a collecting vessel open at the top and at least on one side, at least partially permeable to liquids, rotably carried about a horizontal geometrical axis located at one of the trough or basin walls, and driven by power means to rotate about such an axis from a position adjacent said wall to another position that is inclined relative to the horizontal, at which the collected product can be discharged through said open side, and vice versa.

Substantially, the collecting vessel has a bottom wall impervious to liquids formed by two V-shaped sides, an end wall also of impervious character, and two longitudinal side walls parallel to each other and connected to the bottom and end wall. Initially, that is to say prior to starting the movement for collecting the albumin fraction, the vessel lies with one leg of the V along one of the trough or basin walls. The vessel is rotated through a very slow angular movement, for example by a fraction of a radian per minute, about the geometrical axis, first travelling through the trough or basin, then reaching a level above that of the depleted whey with a resulting removal of the transferred whey and successive discharge of the product collected through the open side of the vessel when the latter takes a sufficient inclination.

Figure 2:
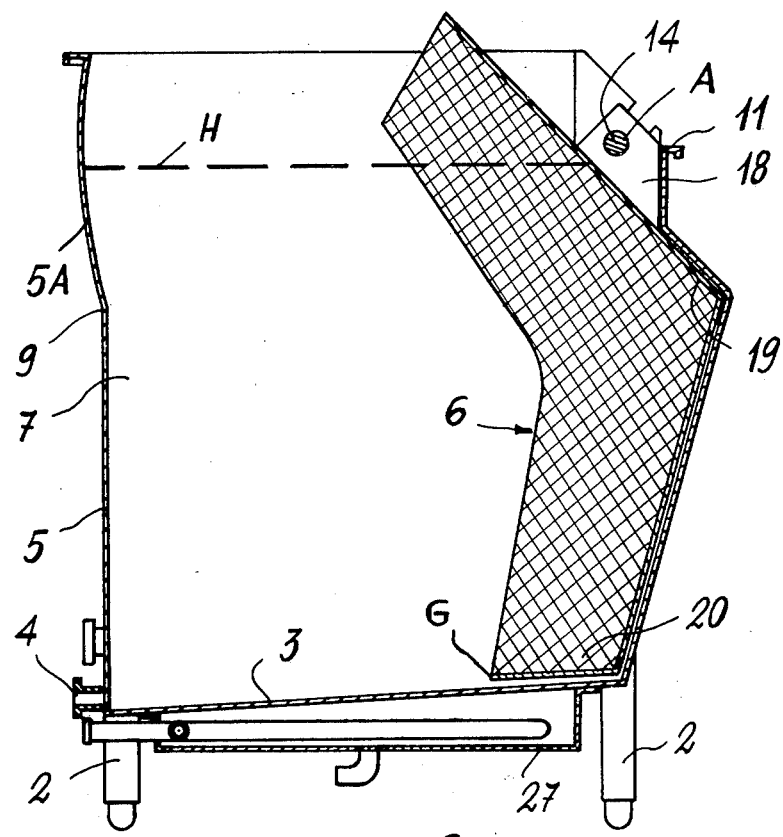

The invention will be more clearly understood from the following detailed description, given by mere way of unrestrictive example, of a preferred embodiment thereof as shown in the accompanying drawings, in which:

FIG. 1 is a side view of the trough or basin, wherein the moving collecting vessel is shown at three different positions, that is a starting or rest position, an intermediate position, and a product discharge position; and FIG. 2 is a vertical sectional view showing the collecting vessel at start or rest position.

Referring to the figures of the accompanying drawings, reference numeral 1 designates as a whole a trough or basin, for example made of rugged stainless steel sheet and internally lined with a layer of polytetrafluoroethylene (Teflon). By means of legs 2 such a trough or basin bears on the ground and has a bottom 3 inclined with respect to the horizontal to facilitate the discharge of depleted whey through a discharge pipe union 4, which can be intercepted through a valve (not shown) and is located at the lower end of a wall 5 of the trough or basin. This wall 5 has a vertical lower section and an upper section 5A of a cylindrical surface, the axis of which is coincident with the geometrical axis A having a vessel 6 (to be described in the following) rotating thereabout and the radius of which is slightly larger than the radial distance between this axis and edge G of vessel 6. The edge, at which the two sections of wall meet, is designated at 9. Two walls 7 are at right angles associated with wall 5.

The trough or basin is completed by a fourth wall 8 having from the bottom a first section inclined to the vertical, but in outward direction, followed by an inwardly inclined section and finally a last substantially vertical section. This wall 8 terminates at a lower level than that of the other walls and has a stop member 11.

Two plates 12 are secured, for example by welding, to the vertical end sections of walls 6. Through bearings, not shown, these two plates support a shaft 14, the geometrical axis of which is indicated at A. Said shaft 14 projects beyond such plates, and a crank 13 is keyed on these projections thereof and has an articulated connection at 16 with the stem 14' of a pressure fluid jack 15, the cylinder of which has an articulated connection at 17 with legs 2 located on the figures of the drawings at the right side thereof.

Vessel 6 is secured on shaft 14 by means of two or more plates 18. These plates 18 are welded to the bottom wall 19 of the vessel. Wall 19 is of V-shaped configuration.

In addition to bottom wall 19, said collecting vessel 6 has a transverse wall 20 and two longitudinal walls 21 parallel to each other. Walls 20 and 21 comprise wire netting or perforated sheet. The three permeable walls 20 and 21 are secured to the bottom wall 19, for example by welding, and longitudinal walls 21 are of a V-shaped pattern. Thus, said collecting vessel 6 is open at the top, as well as at the opposite side to that of wall 20. Its width is slightly less than that of the trough or basin.

At the initial or start position, a section of bottom wall 19 touches or is closely adjacent the lower section of wall 8, whereas the transverse wall is closely spaced from bottom 3. When, under the thrust action of jacks 15, said vessel 6 moves from start position B to inclined postion C, at which the collected product is discharged for transfer to another processing station, for some portion of such a path or movements its edge G will graze the cylindrical section 5A, thus providing a seal preventing the collected solid material from moving back into the trough or basin. A metal box 27 is applied against the underside of bottom 3. A perforated and branched tube 27A enters the inside of this box and has the heating steam introduced therethrough. The steam being produced is for heating the whey in order to bring it to that temperature at which the flocculation of albumin occurs when, for example, citric acid is introduced into the whey. There is also provided a pipe union 30 for whey introduction, which is fitted with a shut off valve, not shown.

The operation is as follows:

Initially, the collecting vessel is at the position B of FIG. 1. The valve at the outlet 4 is closed, whereas to provide for the ingress of the whey to be treated the valve controlling the filling pipe union 30 is open. When the whey has reached level H in trough or basin 1, the whey admission is stopped and through a valve, not shown, the introduction of steam is allowed through tube 27. Upon reaching the required temperature, for example 80° C., a flocculating agent, such as citric acid, is introduced into the whey. Steam introduction is then stopped. Within a very short time, the whey albumin will flocculate and moves to the surface, producing a soft layer or crust. As soon as flocculation has occurred, jacks 15 are operated and collecting vessel 6 starts to move from the position shown at B. The movement is at a considerably low speed, in the order of a fraction of 1 radian/minute. During the rotation within the trough or basin, vessel 6 collects the product, while the liquid displaced during its movement moves along the sides of the vessel without causing any turbulence. When edge G of the vessel 6 reaches edge 9 of wall 5, a sort of sealing is built up which prevents a dispersion of the collected solid product. After vessel 6 has passed level H, the whey still within the vessel will exit through the openings in its walls and discharge in the trough or basin.

The rotation of the vessel is continued and when such a vessel has taken a proper inclination, the collected material will start to discharge outwardly of the trough or basin through the open side of the vessel. On reaching the position C, the movement is stopped by contact of vessel 6 with stop member 11.

The bottom outlet 4 is then opened, whereby the trough or basin is emptied. Jacks 15 are operated in opposite direction, so that vessel 6 moves back to position B. Thus, the trough or basin is ready for a next processing cycle of new whey.

Any further ingredients added to the whey prior to flocculation, such as cream or dried milk, are also collected as mixed with albumin during the above described movement of said collecting vessel 6.

What is claimed is:

1. A device for the flocculation and collection of whey albumin, comprising a trough or basin having a collecting vessel open at the top and at least one side, which is at least partially permeable to liquids and rotatably carried about a horizontal geometrical axis located at one of the basin walls, and controlled by power means so as to rotate about such an axis from a position adjacent said wall to another position inclined with respect to the horizontal, at which latter position the collected product can be discharged through the open side of the collecting vessel, the basin wall opposite to the wall at which the rotating shaft for the collecting vessel is provided having a cylindrical section, of which the center coincides with the axis of rotation and the radial distance of which from such an axis is such that the edge of the transverse wall will graze it during a portion of the vessel movement.

* * * * *